United States Patent
Wischermann

(10) Patent No.: US 7,466,364 B2
(45) Date of Patent: Dec. 16, 2008

(54) DEVICE FOR REDUCING FLICKER DEFECTS

(75) Inventor: Gerhard Wischermann, Weiterstadt (DE)

(73) Assignee: Thomson Licensing, Boulogne Billancourt (FR)

( * ) Notice: Subject to any disclaimer, the term of this patent is extended or adjusted under 35 U.S.C. 154(b) by 244 days.

(21) Appl. No.: 10/332,087

(22) PCT Filed: Jul. 4, 2001

(86) PCT No.: PCT/EP01/07619

§ 371 (c)(1),
(2), (4) Date: Jan. 2, 2003

(87) PCT Pub. No.: WO02/05548

PCT Pub. Date: Jan. 17, 2002

(65) Prior Publication Data

US 2003/0147011 A1    Aug. 7, 2003

(30) Foreign Application Priority Data

Jul. 8, 2000    (DE) .................. 100 33 420

(51) Int. Cl.
H04N 7/01    (2006.01)
H04N 11/20    (2006.01)
H04N 5/00    (2006.01)
G06K 9/40    (2006.01)

(52) U.S. Cl. .............. 348/607; 348/447; 348/622; 348/627; 382/260; 382/262; 382/263; 382/264

(58) Field of Classification Search .......... 348/607, 348/910, 447, 622, 627; 382/260–264; H04N 5/213
See application file for complete search history.

(56) References Cited

U.S. PATENT DOCUMENTS

| 4,322,750 | A | | 3/1982 | Lord et al. |
| 4,551,753 | A | * | 11/1985 | Nishizawa et al. ......... 348/446 |
| 5,001,549 | A | * | 3/1991 | Holmbo et al. ............ 348/182 |
| 5,025,312 | A | | 6/1991 | Faroudja |
| 5,260,775 | A | | 11/1993 | Farouda |
| 5,327,234 | A | * | 7/1994 | Creswick ............... 375/240.08 |
| 5,329,314 | A | * | 7/1994 | Correa et al. ............. 348/448 |
| 5,488,421 | A | * | 1/1996 | Hwang et al. ............. 348/448 |
| 5,488,422 | A | | 1/1996 | Faroudja et al. |
| 5,587,744 | A | * | 12/1996 | Tanaka .................. 348/556 |
| 5,828,366 | A | * | 10/1998 | Hurst .................... 345/204 |
| 5,889,890 | A | * | 3/1999 | Heimburger .............. 382/236 |
| 5,903,680 | A | | 5/1999 | De Haan et al. |
| 5,956,096 | A | * | 9/1999 | Nomura et al. ............ 348/607 |

(Continued)

FOREIGN PATENT DOCUMENTS

DE    4220662    1/1994

(Continued)

Primary Examiner—Brian P Yenke
(74) Attorney, Agent, or Firm—Joseph J. Laks; Robert D. Shedd; Brian J. Cromarty

(57) ABSTRACT

The invention relates to a device for reducing flicker disturbances in a video signal having a temporal median filter and a filter connected downstream. The temporal median filter serves for compensating for brightness fluctuations in the video signal. The filter connected downstream separates high-frequency signal components from the output signal of the temporal median filter and suppresses high-frequency signal components with a high amplitude.

6 Claims, 2 Drawing Sheets

U.S. PATENT DOCUMENTS

| | | | |
|---|---|---|---|
| 5,978,047 A * | 11/1999 | May | 348/616 |
| 5,995,154 A * | 11/1999 | Heimburger | 348/448 |
| 6,064,450 A * | 5/2000 | Canfield et al. | 375/240.29 |
| 6,094,226 A * | 7/2000 | Ke et al. | 348/446 |
| 6,192,079 B1 * | 2/2001 | Sharma et al. | 375/240.16 |
| 6,281,933 B1 * | 8/2001 | Ritter | 348/447 |
| 6,421,097 B1 * | 7/2002 | O'Rourke | 348/607 |
| 6,563,544 B1 * | 5/2003 | Vasquez | 348/447 |
| 6,717,621 B2 * | 4/2004 | O'Rourke | 348/607 |
| 6,900,848 B2 * | 5/2005 | Sendelweck et al. | 348/607 |

FOREIGN PATENT DOCUMENTS

| | | |
|---|---|---|
| EP | 666688 | 8/1995 |
| EP | 0727904 | 8/1996 |
| EP | 0735747 | 10/1996 |
| EP | 0851677 | 7/1998 |

* cited by examiner

DEVICE FOR REDUCING FLICKER DEFECTS

The invention relates to a device for reducing flicker disturbances in a video signal having a temporal median filter for compensating for brightness fluctuations in the video signal.

In historical film material it is often possible to observe large-area and high-frequency—and thus highly disturbing—flicker effects. These brightness fluctuations that occur from film picture to film picture are partly due to ageing and environment, but can also occur as a result of improper handling in the case of new film material. Brightness fluctuations which occur from picture to picture can be effectively reduced by a temporal median filter. However, as undesired side effects, temporal motion artefacts are introduced into the output signal. The said artefacts can be reduced by a motion detector which switches off or reduces the filtering starting from a certain difference between input signal and output signal. Since the motion threshold has to be set to the value of the flicker amplitude (typically 6%), artefacts that are still visible occur in the case of fast motion. Such a filter is implemented e.g. in the MNR11 Noise Reducer from Philips.

The invention is based on the object of providing a device for reducing flicker disturbances which enables the motion artefacts introduced by temporal median filtering to be largely eliminated.

The object is achieved by means of a device for reducing flicker disturbances in a video signal of the type mentioned in the introduction by virtue of the fact that the device contains a temporal median filter for compensating for brightness fluctuations in the video signal and a filter connected downstream for separating a high-frequency signal component from the output signal of the temporal median filter and suppressing high-frequency signal components with a high amplitude.

Exemplary embodiments of the invention are explained in more detail below with reference to the figures, in which.

Figure 1:
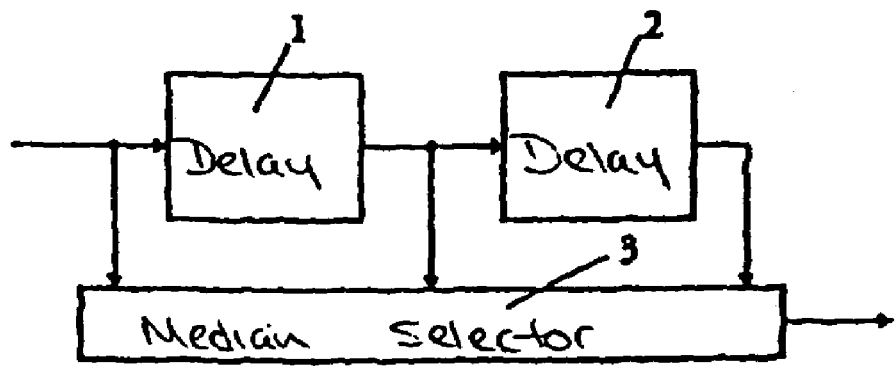
FIG. 1 shows a temporal median filter.

The known temporal median filter illustrated in FIG. 1, which contains two delay stages 1 and 2 and a median selector 3, reduces brightness fluctuations that occur from picture to picture. The delay stages 1 and 2 delay the picture signal for the duration of a frame. The median selector 3 usually comprises a processor which combines pixels of the input signals of the delay stages 1 and 2 and of the output signal of the delay stage 2.

However, the temporal median filter (cf. FIG. 1) introduces undesired temporal motion artefacts into the output signal of the delay stage 2. In order to largely eliminate these motion artefacts, according to the invention a temporal median filter is combined with a filter operating according to the coring technique.

Figure 2:
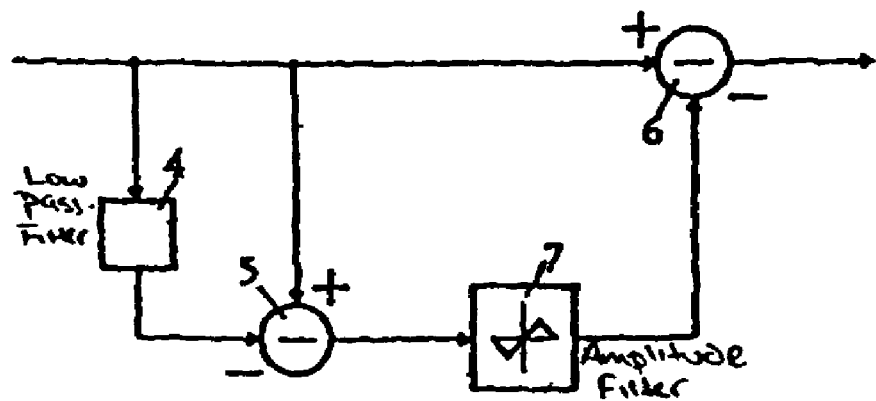
FIG. 2 shows a filter operating according to the coring technique.

FIG. 2 illustrates a known filter operating according to the coring technique, which comprises a low-pass filter 4, subtraction circuit 5 and 6 and an amplitude filter 7. The input signal of this filter operating according to the coring technique is fed to the low-pass filter 4, a non-inverting input of the subtraction circuit 5 and a non-inverting input of the subtraction circuit 6. The output signal of the low-pass filter 4 is fed to an inverting input of the subtraction circuit 5, which forwards the signal resulting from the subtraction to the amplitude filter 7. The amplitude filter 7 suppresses all signal components with a high amplitude. An inverting input of the subtraction circuit 6 receives the output signal of the amplitude filter 7 and combines this output signal with the input signal.

With the aid of the filter operating according to the coring technique, the high-frequency component is extracted from an input signal and subtracted from the input signal for small amplitudes. Thus, a filtering (or noise reduction) takes place only for high-frequency signals with a small amplitude, as a result of which a loss of relevant information is largely avoided.

Figure 3:
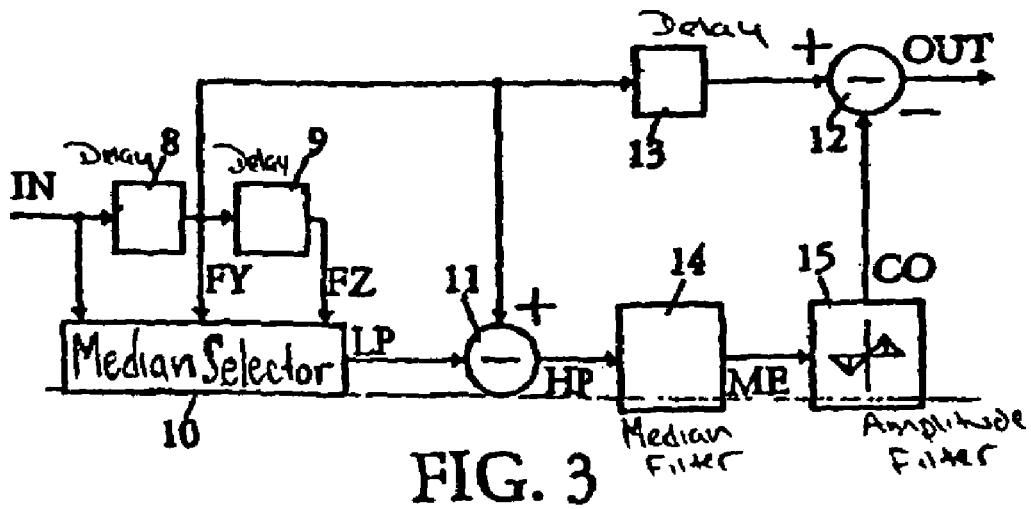
FIG. 3 shows the invention's device for reducing flicker disturbances.

FIG. 3 illustrates the device according to the invention having a temporal median filter and having a filter operating according to the coring technique. The device for suppressing flicker disturbances contains a temporal median filter, which comprises delay stages 8 and 9 and a median selector 10, and subtraction circuits 11 and 12, a further delay stage 13, a horizontally and vertically acting median filter 14 and an amplitude filter 15. The median selector 10 receives the input signal IN of the device and the output signals FY and FZ of the delay stages 8 and 9. The output signal FY of the delay stage 8, which receives the input signal IN, is fed to a non-inverting input of the subtraction circuit 11 and, via the delay stage 13, to a non-inverting input of the subtraction circuit 12. The output signal LP of the median selector 10 is the input signal of an inverting input of the subtraction circuit 11, which forwards its output signal HP via the horizontally and vertically acting median filter 14 (output signal ME) to the amplitude filter 15. The output signal CO of the amplitude filter 15 is fed via an inverting input to the subtraction circuit 12, which forms the output signal OUT of the device for reducing flicker disturbances.

The temporal median filter selects the mean brightness value over at least three film pictures and thus suppresses flicker disturbances. However, temporal motion artefacts are introduced in the signal LP. A temporally median-filtered high-pass signal comprising the flicker disturbances and the motion artefacts is present at the output of the subtraction circuit 11. Since the flicker disturbances occur over the entire picture (that is to say over a very large area), they pass through the horizontally and vertically acting median filter 14 unimpeded. The motion artefacts, whose horizontal and vertical size is restricted to the size of the moving objects, are suppressed by the median filter 14. In practice, a filter aperture over approximately 9 lines and 15 pixels has proved to be sufficient.

In principle, instead of the horizontally and vertically acting median filter 14, a linear 2D filter could also be used for suppressing the artefact signal. The median filter 14 is preferred, however, for completely eliminating the artefacts having a pulsed profile.

Figure 4:
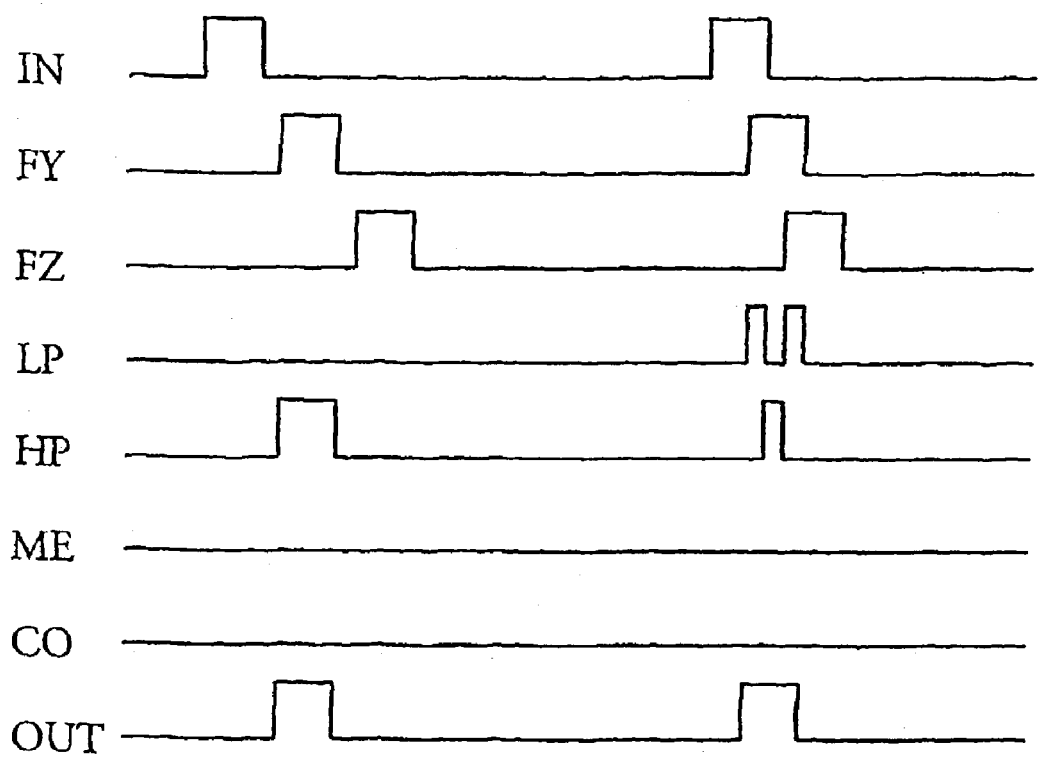
FIG. 4 shows exemplary time profiles of signals which occur in the device according to FIG. 3.

The exemplary time profiles of signals that occur in the device according to the invention are shown in FIG. 4. FIG. 4 shows the origination of the artefact signal for a rapidly moving object (the picture-to-picture displacement is larger than the object width) and for a slowly moving object (the displacement is smaller than the object width). In order to completely suppress the said artefact signal, the aperture of the median filter 14 must be at least twice as large as the rapidly moving object. The downstream amplitude filter 15 with a coring characteristic curve additionally ensures that residual artefacts with a large amplitude that possibly occur are suppressed. The thresholds A and −A of the coring characteristic curve are set to the largest flicker amplitude to be expected. The disturbance signal elimination takes place by subtraction of the output signal (flicker signal) of the amplitude filter 15 from the delay-equalized input signal (T+1 frame/picture) (output signal of the delay stage 13). T is the delay time of the horizontally and vertically acting median filter 14. It goes without saying that by using a temporal median filter having more than two delay stages (selection of three pictures), it is possible to extend the suppression to lower-frequency flicker disturbances. In the 60 Hz standard, the median filter having two delay stages has the maximum suppression or extinction at 6.25 Hz flicker frequency, which already yields very good results.

The invention claimed is:

1. Device for reducing large area flicker in a video signal having a temporal median filter for compensating for brightness fluctuation in the video signal, a median filter connected downstream from said temporal median filter for suppressing motion artifacts in an output of said temporal median filter, a filter connected downstream from said median filter for passing high-frequency signal components with a low amplitude; and a first subtraction circuit for subtracting the high-frequency signal components with a low amplitude from a delayed video signal, wherein the median filter connected downstream contains a second subtraction circuit and wherein the filter connected downstream from said median filter comprises an amplitude filter, wherein the second subtraction circuit is provided for combining the inverted output signal of the temporal median filter and the delayed video signal and the amplitude filter is provided for suppressing the signal components with a low amplitude in the output signal of the second subtraction circuit, and wherein the first subtraction circuit which supplies the output signal from which flicker disturbances have largely been eliminated, is provided for combining the delayed video signal and the inverted output signal of the amplitude filter.

2. Device according to claim 1, wherein a horizontally and vertically acting median filter is connected between the second subtraction circuit and amplitude filter.

3. A method for reducing flicker disturbances in a video signal comprising the activities of:

compensating for brightness fluctuation in the video signal using a temporal median filter;

suppressing motion artifacts in a compensated video signal, wherein suppressing motion artifacts includes combining the inverted output signal of said temporal median filter and a delayed video signal and suppressing signal components with a low amplitude in the combined signal;

passing high-frequency signal components with a low amplitude in a suppressed compensated video signal to produce a filtered video signal; and subtracting the high-frequency signal components with a low amplitude of the filtered video signal from a delayed video signal for supplying an output signal from which flicker disturbances have largely been eliminated.

4. A device for reducing large area flicker in a video signal comprising:

a temporal median filter for compensating for brightness fluctuations in the video signal;

a first subtraction circuit for subtracting the compensated signal from the video signal, thereby producing a temporally median filtered high-pass signal;

a spatial filter receiving the temporally median filtered high-pass signal;

an amplitude filter receiving the spatially filtered signal and suppressing signals having an amplitude exceeding a threshold;

a second subtraction circuit for subtracting the amplitude-filtered signal from the delayed video signal and providing an output signal from which flicker disturbances have largely been eliminated.

5. The device of claim 4, wherein the spatial filter comprises a horizontally and vertically acting median falter or a two-dimensional linear filter.

6. A method for reducing large area flicker in a video signal comprising the steps of:

compensating for brightness fluctuation in the video signal using a temporal median filter;

subtracting the compensated signal from the video signal, thereby producing a temporally median filtered high-pass signal;

passing the temporally median filtered high-pass signal via a spatial filter;

passing the spatially filtered signal via an amplitude filter, suppressing signals having an amplitude exceeding a threshold;

subtracting the output signal of the amplitude filter from a delayed video signal; and providing an output signal from which flicker disturbances have largely been eliminated.

* * * * *